No. 680,841. Patented Aug. 20, 1901.
R. E. CHAPMAN.
BALING PRESS.
(Application filed Apr. 24, 1901.)
(No Model.) 3 Sheets—Sheet 2.
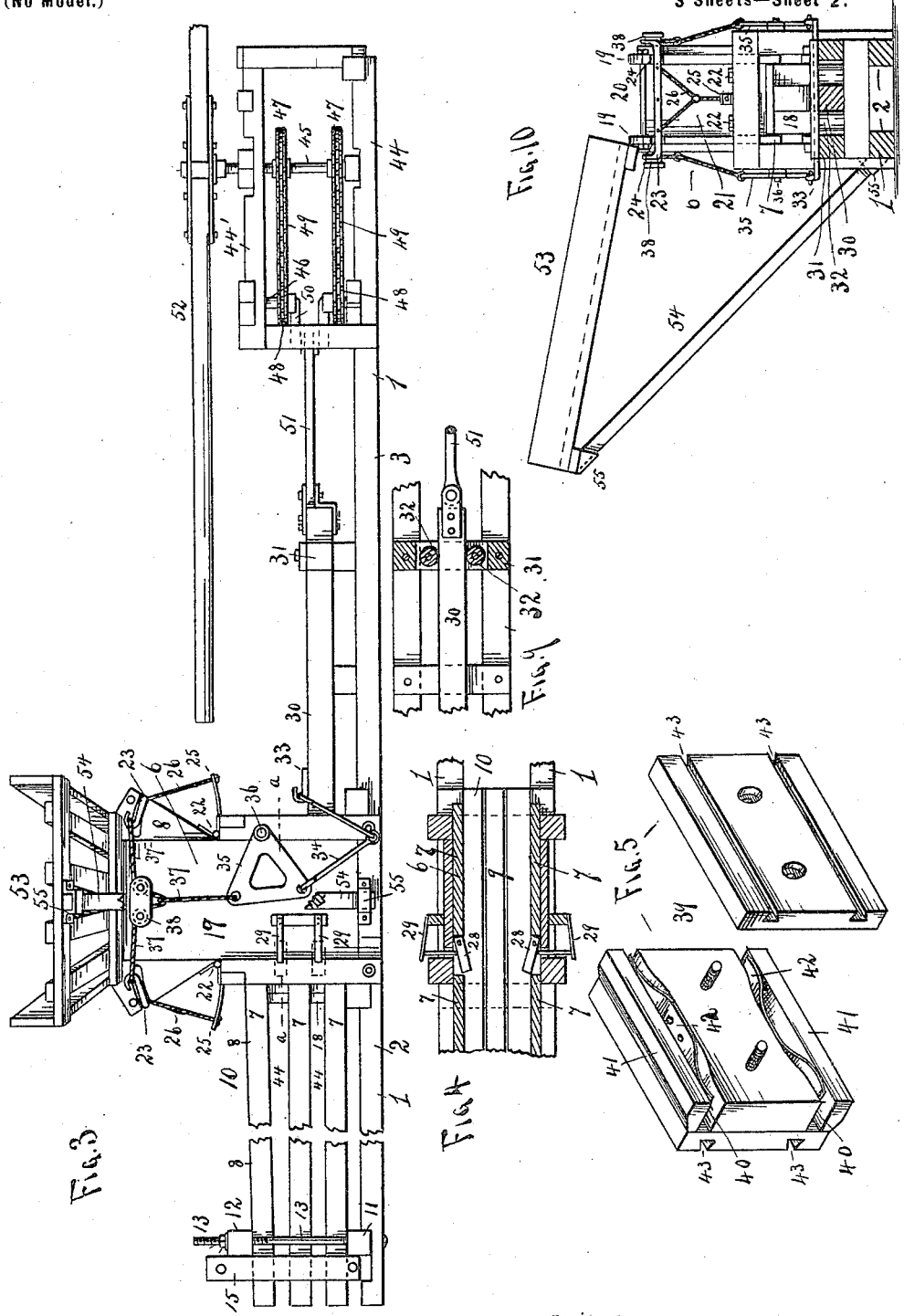

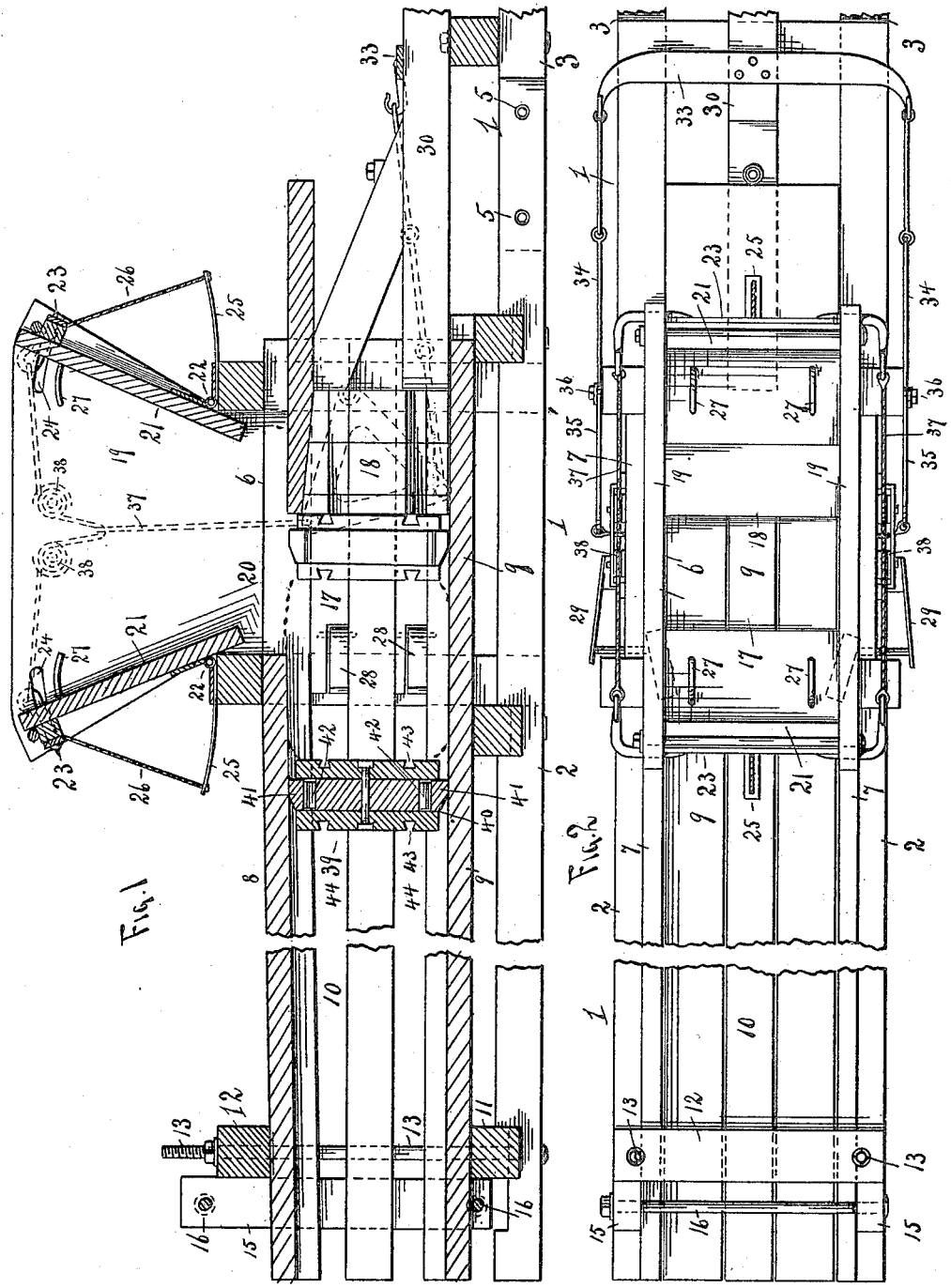

No. 680,841. Patented Aug. 20, 1901.
R. E. CHAPMAN.
BALING PRESS.
(Application filed Apr. 24, 1901.)
(No Model.) 3 Sheets—Sheet 3.
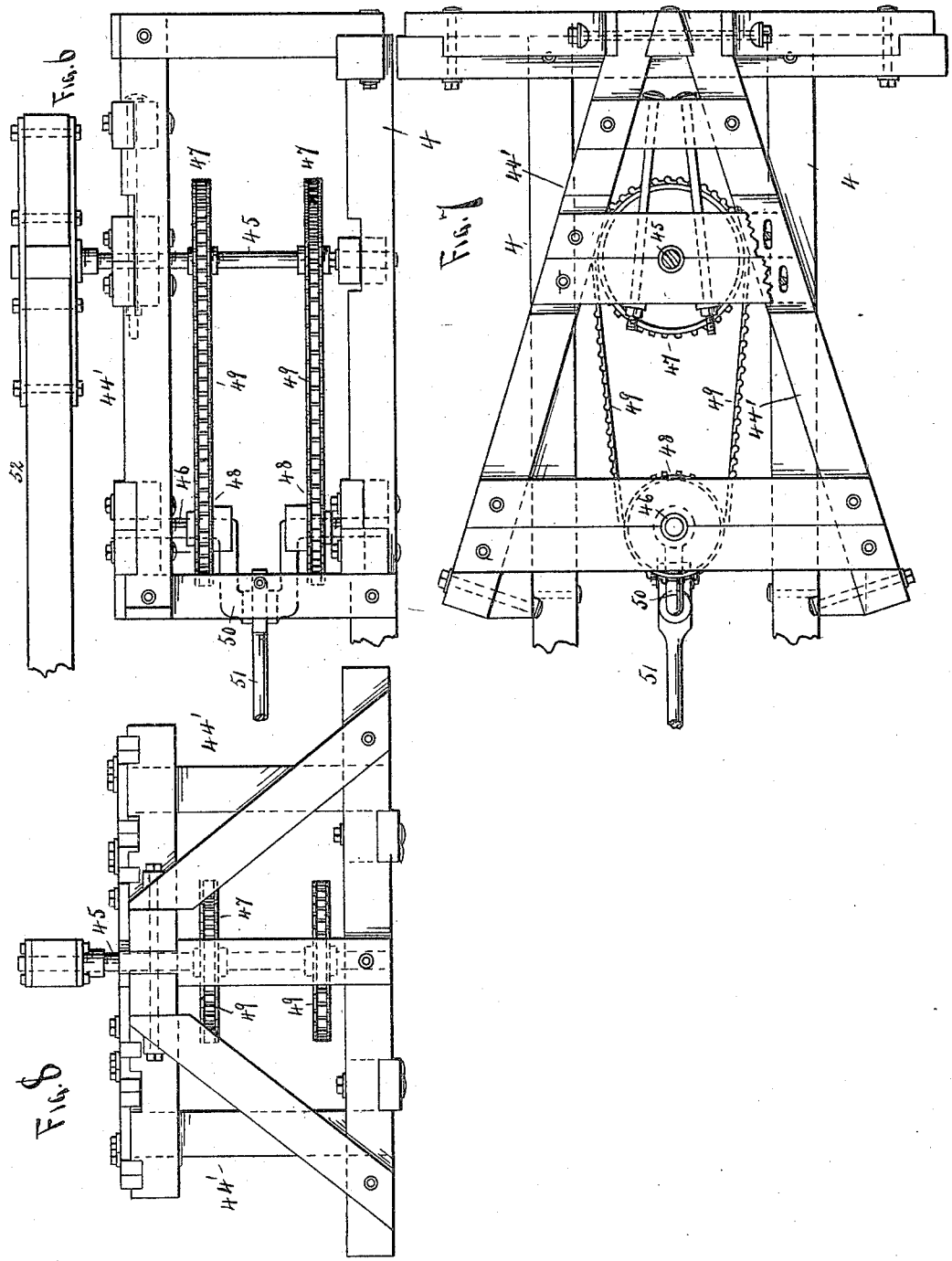

UNITED STATES PATENT OFFICE.

ROBERT E. CHAPMAN, OF CHEROKEE, TEXAS.

BALING-PRESS.

SPECIFICATION forming part of Letters Patent No. 680,841, dated August 20, 1901.

Application filed April 24, 1901. Serial No. 57,286. (No model.)

*To all whom it may concern:*

Be it known that I, ROBERT E. CHAPMAN, a citizen of the United States, residing at Cherokee, in the county of San Saba and State of Texas, have invented a new and useful Baling-Press, of which the following is a specification.

My invention is an improved baling-press; and it consists in the peculiar construction and combination of devices hereinafter fully set forth and claimed.

In the accompanying drawings, Figure 1 is a vertical longitudinal sectional view showing the operative parts of my improved baling-press. Fig. 2 is a top plan view of the same. Fig. 3 is a side elevation of the same, showing the horse-power and the plunger-rod connected to the pitman thereof. Fig. 4 is a horizontal sectional view taken on a plane indicated by the line $a\ a$ of Fig. 3. Fig. 5 is a detail perspective view illustrating the construction of one of the division-blocks. Fig. 6 is a detail side elevation of the horse-power for operating the plunger of the press. Fig. 7 is a top plan view of the same. Fig. 8 is an end elevation of the same. Fig. 9 is a detail sectional view showing the guiding-head for the plunger-rod. Fig. 10 is a transverse sectional view of the press, showing the feed-table disposed in operative position on one side thereof.

The sills 1 of the main frame comprise the sections 2, 3, and 4, which are detachably secured together, as by bolts 5. On the sections 2 of the sills is erected the press-box 6, which is of suitable length, and the sides 7, top 8, and bottom 9 of which extend longitudinally in one direction to form a bale-chamber 10, which when the press is in operation contains the bales after they are formed and from which the bales are successively ejected by the action of the plunger in the formation of a new bale. Yoke-bars 11 12 are disposed, respectively, under the bottom and over the top of the chamber 10, near the outer end thereof, and are connected together by bolt-rods 13, by means of which the yoke-bar 12 may be depressed to correspondingly depress the outer end of the top 8, and thereby contract the discharge-opening 14 at the outer end of the chamber 10. Similar yoke-bars 15 are disposed on the sides 7 of chamber 10, near the discharge end of the latter, and are connected together by bolt-rods 16, by means of which they may be adjusted to contract the space between the sides 7 at the discharge end of chamber 10. By this construction the discharge end of the bale-chamber 10 may be contracted, both vertically and laterally, to retard the passage therethrough of the finished bales, and hence cause the bales to be compressed by the plunger to the desired density.

That portion of the press-box which is at the front end of the chamber 10 I call the "baling-chamber" 17, in which the bales are formed and from which the bales are moved by the subsequent action of the plunger 18 into the bale-chamber 10. The said baling-chamber 17 is provided with vertically-extending sides 19 of suitable height, and a feed-opening 20 is formed on the upper side of said baling-chamber between the vertical sides 19. Condensing-boards 21 are disposed between the vertical sides 19 and are hinged near their lower sides on the frame of the press-box, as at 22, and said condensing-boards are adapted to move from the inclined positions shown in Fig. 1 of the drawings to a vertical position, as will be understood. On the outer sides of said condensing-boards, near their upper edges, are yokes 23, which operate in curved slots 24 in the vertical sides 19, said curved slots being concentric with the pivotal axes of the hinges 22. Springs 25, which project outward from the condensing-boards and are secured on the frame of the press-box, have their outer ends connected to the yokes 23, as at 26. The function of said springs, as will be understood, is to normally retain the condensing-boards 21 in the inclined positions shown in Fig. 1. The said condensing-boards, on their inner sides near their upper edges, are provided with inwardly-projecting downturned teeth 27 of suitable length.

In the sides of the baling-chamber 17 at the front end of the bale-chamber 10 are disposed pivoted dogs 28, which are pressed inward by the springs 29. The said dogs by engagement with a bale as the same is forced rearward from the baling-chamber 17 into the bale-chamber 10 prevent reverse movement of the bale when the same is released by the outstroke of the plunger. From the front side of the plunger 18 extends the plunger-rod 30, which is of suitable length and is maintained against lateral movement and directed in a straight line by a guide-head 31, in which are rollers 32, that bear on opposite sides of said plunger-rod. The latter is provided on its upper side at a suitable distance in advance of the plunger with a yoke-bar 33.
The same is connected by suitable links 34 to bell-crank levers 35, that are mounted on the sides of the press-box, as at 36. The said bell-crank levers are connected by suitable cords or other flexible connecting elements 37 to the yokes 23 of the condensing-boards 21. The said cords 37 pass over suitable direction-sheaves 38.

From the foregoing description and by reference to the drawings it will be understood that at each instroke of the plunger the connections between the latter and the condensing-boards are slackened, thereby causing the springs 25 to dispose the condensing-boards in the inclined positions shown in Fig. 1, where they serve to arrest and retain a quantity of hay thrown between the vertical sides 19 and prevent the same from passing through the feed-opening 20 while the plunger is compressing the partially-formed bale in the press-box. On the ensuing outstroke of the plunger the latter, through the connections hereinbefore described, draws the upper sides of the condensing-boards 21 inwardly, thereby disposing the said condensing-boards in a vertical position, slightly condensing the hay below the teeth 27 between them, and causing the hay to drop from between the said condensing-boards and the vertical sides 19 through the feed-opening 20 into the baling-chamber 17 in rear of the plunger. Such hay as is fed to the press while the condensing-boards are thus operating is retained above the teeth 27 to be dropped therefrom between the condensing-boards as the latter subsequently open. As each bale is formed a division-block 39 is placed behind the finished bale. The construction of the division-block is illustrated in detail in Fig. 5, and the same is provided on its upper and lower sides with grooves 40, in which are disposed friction-shoes 41, that are movable therein and are pressed outward by springs 42 into frictional engagement with the upper and lower sides of the bale-chamber. The said division-blocks are provided on their front and rear sides with grooves 43, through which the binding-wires may be passed around the bale, the said grooves registering with longitudinal slots 44 in the sides of the bale-chamber to permit of the binding of the bales in the usual manner. It will be understood that when a bale has been formed and pressed rearward by the action of the plunger until the division-block in front of the bale has passed the dogs 28 the latter by engagement with the division-block effectually prevent the finished bale from moving forward while the plunger is co-acting with the division-block in the formation of another bale.

On the front portions of the sills 1 is a frame 44' of suitable construction, in which are journaled a vertically-disposed power-shaft 45 and a vertically-disposed crank-shaft 46. Each of the said shafts is provided with a pair of sprocket-wheels. The sprocket-wheels 47 on shaft 45 are connected to the sprocket-wheels 48 on the crank-shaft 46 by endless sprocket-chains 49. The proportions of the respective sprocket-wheels may be varied to cause the crank-shaft to rotate at any desired rate of speed with relation to the power-shaft 45, and in practice I employ a number of sprocket-wheels of varying sizes, which are adapted to be placed on the respective power-shaft and crank-shaft in order to cause the latter to make as many revolutions to a single revolution of the former as may be desired. The crank 50 of crank-shaft 46 is connected to the plunger-rod by a pitman 51, and thereby motion is communicated to the plunger, as will be understood. A suitable sweep-lever 52 is attached to the upper end of the vertical power-shaft 45, and one or more horses may be attached to said sweep-lever to furnish power for the press.
A feed-table 53, which is preferably of the construction shown, has its inner end detachably connected to one of the vertical sides 19 of the press-box, and the outer portion of said feed-table is supported by a brace-bar 54, the ends of which are inserted in keepers 55, with which said feed-table and the press-box are respectively provided. The said feed-table is supported in an inclined position and hay thrown thereon by gravity is fed therefrom to the press, as will be understood.

The bearings for the power-shaft 45 are adjustable by means of bolts, as shown, whereby the chains 49 may be kept at the required tension.
Having thus described my invention, I claim—

1. The combination of a press-box having a feed-opening on its upper side, and vertical side boards extending above and on opposite sides of said opening, condensing-boards hinged at their lower sides on said press-box, said condensing-boards being disposed on opposite sides of said feed-opening and between said side boards and having yokes on their outer sides, the ends of which yokes operate in curved slots with which said side boards are provided, spring-arms projecting outwardly from the press-box, connections between said condensing-boards and said spring-arms, the latter serving to normally open said condensing-boards outwardly from each other, a reciprocating plunger and connections between said plunger and said condensing-boards, substantially as described.
2. The combination of a press-box having a feed-opening on its upper side, and pivoted condensing-boards above and on opposite sides of said feed-opening, said condensing-boards having inwardly-projecting downturned teeth on their inner sides, and means to operate said condensing-boards, substantially as described.

3. In a baling-press, the combination of a press-box, a plunger-rod extending therefrom, guides for said plunger-rod, said guides being on extended sills with which the press-box is provided, a frame on said extended sills, a vertically-disposed power-shaft in bearings in said frame, said power-shaft having a sweep-lever and sprocket-wheels, a vertically-disposed crank-shaft in bearings in said frame, said crank-shaft having sprocket-wheels, endless sprocket-chains connecting the sprocket-wheels of the crank and power shafts respectively, and a pitman connected to said plunger and to the crank of said crank-shaft substantially as described.

4. The combination of a press-box having a feed-opening on its upper side, pivoted condensing-boards above and on opposite sides of said feed-opening, springs to normally move said condensing-boards outwardly from each other, a reciprocating plunger, bell-crank levers on the sides of the press-box, cords connecting each of said levers to both of said condensing-boards, guides for said cords, and connections between said plunger and said levers, whereby said condensing-boards are moved toward each other on the outstrokes of the plunger, substantially as described.

In testimony that I claim the foregoing as my own I have hereto affixed my signature in the presence of two witnesses.

ROBERT E. CHAPMAN.

Witnesses:
JOHN MAGILL,
J. C. TOM.